(12) United States Patent
Gomez (10) Patent No.: US 9,195,306 B2
(45) Date of Patent: Nov. 24, 2015

(54) VIRTUAL WINDOW IN HEAD-MOUNTABLE DISPLAY

(71) Applicant: Google Inc., Mountain View, CA (US)

(72) Inventor: Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/528,889

(22) Filed: Oct. 30, 2014

(65) Prior Publication Data

US 2015/0049018 A1 Feb. 19, 2015

Related U.S. Application Data

(63) Continuation of application No. 13/429,072, filed on Mar. 23, 2012, now Pat. No. 8,912,979.

(60) Provisional application No. 61/507,874, filed on Jul. 14, 2011.

(51) Int. Cl.
*G09G 5/00* (2006.01)
*G06F 3/01* (2006.01)
(Continued)

(52) U.S. Cl.
CPC .............. *G06F 3/012* (2013.01); *G02B 27/017* (2013.01); *G09G 3/001* (2013.01); *G02B 2027/0178* (2013.01)

(58) Field of Classification Search
CPC ......... G06F 3/011; G06F 3/013; G06F 3/012; G06F 1/163; G06F 3/017; G06F 17/28; G06F 1/3206; G06F 1/3234; G06F 2203/011; G06F 3/0346; G06F 9/46; G06F 17/2785; G06F 17/30595; G06F 3/005; G06F 1/1654; G06F 1/1656; G06F 1/1684; G06F 1/1615; G06F 1/1616; G06F 1/1632; G09G 3/02; G09G 3/001; G09G 5/14; G09G 2340/10; G09G 2340/12; G09G 2340/125; G09G 3/003; G09G 3/2003; G09G 5/00; G09G 5/10
USPC ............................ 345/1.1–1.3, 169, 156, 7–9
See application file for complete search history.

(56) References Cited

U.S. PATENT DOCUMENTS 5,495,576 A 2/1996 Ritchey
6,184,847 B1 * 2/2001 Fateh et al. ........................ 345/8
(Continued)

OTHER PUBLICATIONS

Billinghurst, Mark, et al., "A Wearable Spatial Conferencing Space," In Wearable Computers, 1998. Digest of Papers. Second International Symposium on, IEEE, 1998, pp. 76-83.
(Continued)

*Primary Examiner* — Duc Dinh
(74) *Attorney, Agent, or Firm* — McDonnell Boehnen Hulbert & Berghoff LLP (57) ABSTRACT

Methods and systems involving a virtual window in a head-mounted display (HMD) are disclosed herein. An exemplary system may be configured to: (i) receive head-movement data that is indicative of head movement; (ii) cause an HMD to operate in a first mode in which the HMD is configured to: (a) simultaneously provide a virtual window and a physical-world view in the HMD; (b) display, in the virtual window, a portion of a media item that corresponds to a field of view; (c) determine movement of the field of view; and (d) update the portion of the media item that is displayed in the virtual window; (iii) receive mode-switching input data and responsively cause the HMD to switch between the first mode and a second mode; and (iv) responsive to the mode-switching input data, cause the HMD to operate in the second mode.

19 Claims, 7 Drawing Sheets

(51) Int. Cl.
  *G02B 27/01* (2006.01)
  *G09G 3/00* (2006.01)

(56) References Cited

U.S. PATENT DOCUMENTS

| | | | |
|---|---|---|---|
| 6,346,929 | B1 | 2/2002 | Fukushima et al. |
| 6,359,603 | B1 | 3/2002 | Zwern |
| 6,396,497 | B1 | 5/2002 | Reichlen |
| 6,847,336 | B1 | 1/2005 | Lemelson et al. |
| 7,542,210 | B2 | 6/2009 | Chirieleison, Sr. |
| 7,639,208 | B1 | 12/2009 | Ha et al. |
| 8,576,276 | B2 * | 11/2013 | Bar-Zeev et al. ............... 348/53 |
| 2002/0044152 | A1 | 4/2002 | Abbott, III et al. |
| 2002/0158827 | A1 * | 10/2002 | Zimmerman ................. 345/88 |
| 2007/0177275 | A1 | 8/2007 | McGuire, Jr. |
| 2010/0079356 | A1 * | 4/2010 | Hoellwarth ..................... 345/8 |
| 2010/0125816 | A1 | 5/2010 | Bezos |
| 2010/0157400 | A1 | 6/2010 | Dimov et al. |
| 2010/0299630 | A1 | 11/2010 | McCutchen et al. |
| 2011/0001699 | A1 | 1/2011 | Jacobsen et al. |

OTHER PUBLICATIONS

Schmalstieg, Dieter et al. "The World as a User Interface: Augmented Reality for Ubiquitous Computing," Location Based Services and TeleCartography, Springer Berlin Heidelberg, 2007, pp. 369-391.

* cited by examiner

VIRTUAL WINDOW IN HEAD-MOUNTABLE DISPLAY

CROSS REFERENCE TO RELATED APPLICATIONS

This application is a continuation of co-owned U.S. patent application Ser. No. 13/429,072, filed on Mar. 23, 2012, which claims priority to U.S. Provisional Application No. 61/507,874, filed on Jul. 14, 2011, both of which are herein incorporated by reference for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, a system according to an exemplary embodiment may include a non-transitory computer-readable medium, as well as program instructions stored on the non-transitory computer-readable medium that are executable by at least one processor to: (i) receive head-movement data that is indicative of head movement; (ii) cause a head-mounted display (HMD) to operate in a first mode in which the HMD is configured to: (a) simultaneously provide a virtual window and a physical-world view in the HMD; (b) display, in the virtual window, a portion of a media item that corresponds to a field of view, wherein the field of view is moveable in a substantially continual manner throughout the media item; (c) determine, based on the head-movement data, movement of the field of view; and (d) update the portion of the media item that is displayed in the virtual window according to the determined movement of the field of view; and (iii) cause the HMD to operate in a second mode in which the HMD is configured to: (e) cause a selection icon and a specific portion of the media item to be displayed in the virtual window; (f) determine, based on the head-movement data, movement of the selection icon within the virtual window; and (g) move the selection as determined within the virtual window while displayed the specific portion of the media item.

In a further aspect, a computer-implemented method according to an exemplary embodiment may involve: (i) receiving, at a wearable computer, head-movement data that is indicative of head movement; (ii) causing a head-mounted display (HMD) to operate in a first mode by: (a) simultaneously providing a virtual window and a physical-world view in a head-mounted display (HMD); (b) displaying a portion of a media item in the virtual window, wherein the portion of the media item that is displayed corresponds to a field of view, wherein the field of view is moveable in a substantially continual manner throughout the media item; (c) using the head-movement data as a basis for determining movement of the field of view within the media item; and (d) updating the portion of the media item that is displayed in the virtual window according to the determined movement of the field of view; and (iii) causing the HMD to operate in the second mode by: (e) causing a selection icon and a specific portion of the media item to be displayed in the virtual window; (f) determining, based on the head-movement data, movement of the selection icon within the virtual window; and (g) moving the selection as determined within the virtual window while displayed the specific portion of the media item.

In yet a further aspect, non-transitory computer-readable medium according to an exemplary embodiment may have instructions stored thereon that include: (i) instructions for receiving head-movement data that is indicative of head movement; (ii) instructions for causing a head-mounted display (HMD) to operate in a first mode by: (a) simultaneously providing a virtual window and a physical-world view in a head-mounted display (HMD); (b) displaying a portion of a media item in the virtual window, wherein the portion of the media item that is displayed corresponds to a field of view, wherein the field of view is moveable in a substantially continual manner throughout the media item; (c) using the head-movement data as a basis for determining movement of the field of view within the media item; and (d) updating the portion of the media item that is displayed in the virtual window according to the determined movement of the field of view; and (iii) instructions for causing the HMD to operate in the second mode by: (e) causing a selection icon and a specific portion of the media item to be displayed in the virtual window; (f) determining, based on the head-movement data, movement of the selection icon within the virtual window; and (g) moving the selection as determined within the virtual window while displayed the specific portion of the media item.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

An exemplary embodiment involves a virtual window that may be incorporated as a graphical element in the display of a wearable computer (e.g., in a head-mounted display (HMD)). The virtual window may be configured to display a portion of a given media item, such as an image or a video, and to scroll or pan within the media item in response to certain intuitive user gestures, such as head movements.

In addition, the virtual window may only occupy a portion of the user's field of view so that the user can view the virtual window and the physical world simultaneously. This may be accomplished, for example, by displaying the virtual window in a graphic display that is embedded in a larger transparent lens element. Alternatively, the virtual window may be overlaid or otherwise displayed within a larger graphical display of a physical-world view. For instance, the virtual window may be overlaid on a larger display of a point-of-view video feed. In either case, an exemplary virtual window may provide the wearer of an HMD with the sensation of looking through a window into a larger virtual world.

As a specific example, a virtual window may allow a user to interact with a map of the United States. To do so, the virtual window provides a field of view to a portion of the map (e.g., a one-mile by one-mile square of the map). The wearable computer may then detect movements of the user's head and move the field of view within the map in a manner that follows the head movements. For instance, if the wearable display detects that the user has looked up, down, left, or right, then the virtual window may pan to the north, south, west, or east, respectively. Further, when the virtual window is panning within the map, the scale of the map may be kept substantially constant, such that during panning, the virtual window continues to display, for example, a one mile by one mile portion of the map. By allowing the user to navigate the map in this manner, an exemplary virtual window may provide the user with the sensation that the map is much larger than the size of the virtual window.

In a further aspect, once the user has moved the field of view so that the virtual window displays a desired portion of the media item, the wearable computer may allow the user to switch modes of operation so that the user can interact more granularly within the desired portion. Continuing the example of a United States map, when a user has navigated to a desired area of the map, the wearable computer may allow the user to lock the virtual window and then operate a reticle within the virtual window. In particular, the wearable computer may allow the user to move the reticle via head movements. As such, the user can move the reticle to a specific point of interest within the displayed portion of the map (e.g., a certain building or intersection). When the reticle is moved to a specific point of interest, the wearable computer may display information related to the point of interest. Further, the wearable computer may allow the user to interact with the map, such as by allowing the user to select and initiate a search based on something located at point of interest.

It should be understood that the above example and the other examples described herein are provided for illustrative purposes. As such, the examples should not be construed as limiting the scope of the invention.

II. Exemplary Methods

In an exemplary embodiment, the wearable computer may operate the HMD in at least two modes. For example, the operation modes of the HMD may include: (i) a virtual navigation mode, which allows a user to navigate through a media item in the virtual window, via the user's head movements, and (ii) a virtual selection mode, which allows the user to lock to on a particular portion of the media item and interact with the portion via the user's head movements. These two modes may also allow a user to change their physical context between a virtual field of view and the physical-world (e.g., "real-world").

Figure 1:
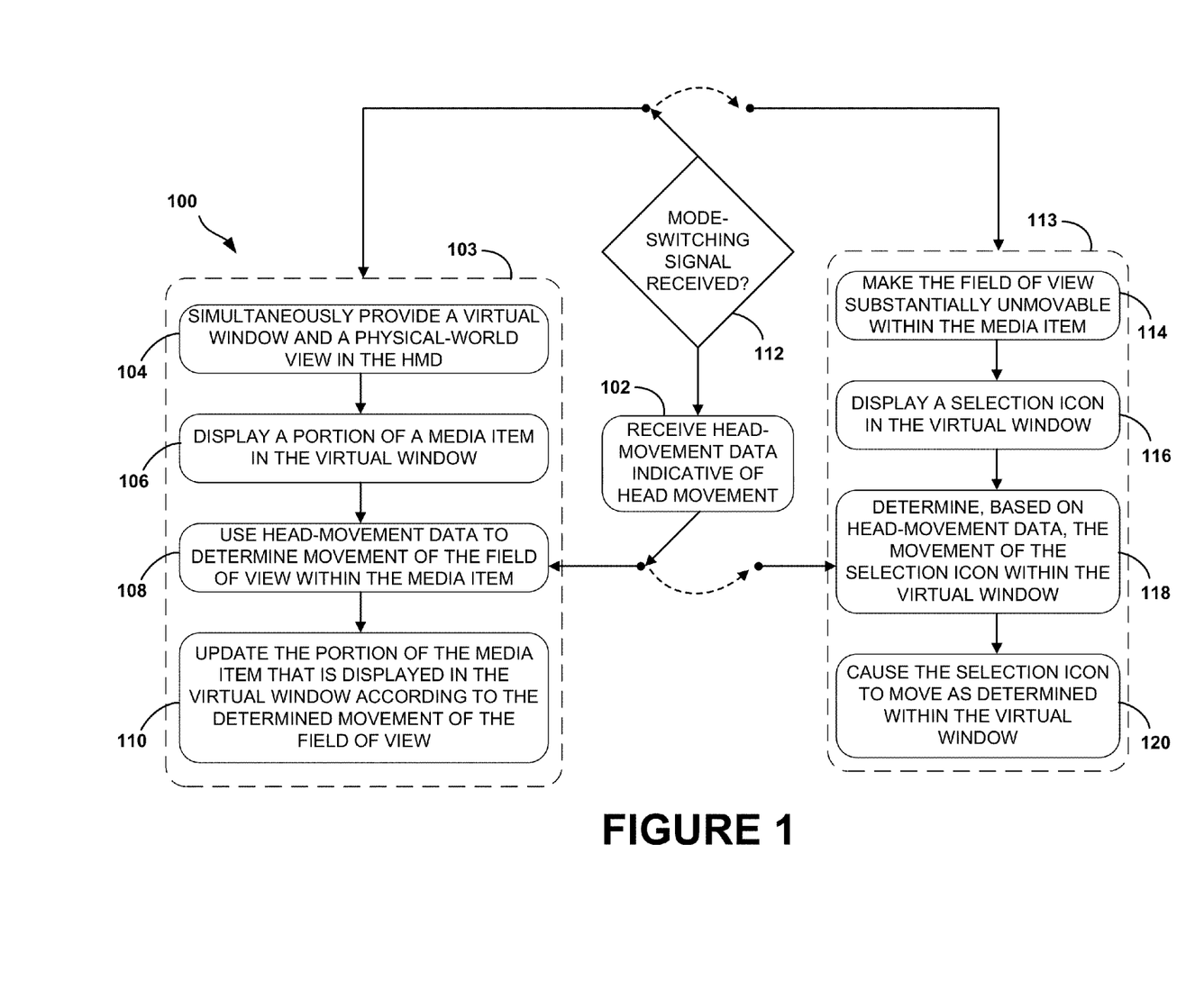
FIG. 1 is a simplified flow chart illustrating a method according to an exemplary embodiment.

FIG. 1 is a simplified flow chart illustrating a method according to an exemplary embodiment. Method 100 is described by way of example as being carried out by a wearable computer, and in particular, by a wearable computer that includes an HMD. However, it should be understood that exemplary methods, such as method 100, may be carried out by devices other than a wearable computer, and/or may be carried out by sub-systems in a wearable computer or in other devices. For example, an exemplary method may alternatively be carried out by a device such as a mobile phone, which is configured to simultaneously display a media item in a virtual window and a point-of-view video feed in a physical-world window. Other examples are also possible. An exemplary method may be used to provide a virtual window, and to allow a user to navigate within and/or interact with a media item, which is typically larger than the virtual window, via head movements.

More specifically, exemplary method 100 involves a wearable computer receiving head-movement data that is indicative of head movement (e.g., indicative of sensed movements of the head by a user of the wearable computer), as shown by block 102. The wearable computer can operate the HMD in a first mode, which in the illustrated embodiment, is a virtual navigation mode 103. In this mode, the wearable computer simultaneously provides a virtual window and a physical-world view in the HMD, as shown by block 104. In the virtual navigation mode, the wearable computer causes the HMD to display a portion of a media item in the virtual window, as shown by block 106. The portion of the media item that is displayed in the virtual window corresponds to a field of view. Further, this field of view is moveable in a substantially continual manner via head movements, which allows a user to look around within the media item using such head movements.

In particular, the wearable computer may use head-movement data to determine movement of the field of view within the media item, as shown by block 108. The wearable computer may then update the portion of the media item that is displayed in the virtual window according to the determined movement of the field of view, as shown by block 110. In an exemplary embodiment, the displayed portion of the media item may be updated in real-time, as head-movement data is received. Further, the displayed portion of the media item may be updated frequently, such that movements of the field of view appear to substantially continual. For example, the virtual window may allow a user to scan, scroll, pan, or otherwise move the field of view in a substantially continual manner within the media item, via movements of the head.

Method 100 further involves the wearable computer receiving mode-switching input data, as shown by block 112, and responsively causing the HMD to switch from the first mode to the second mode. In exemplary method 100, the wearable computer switches between a virtual navigation mode 103 and a virtual selection mode 113. In the virtual selection mode 113, the wearable computer makes the field of view substantially unmovable within the media item, as shown by block 114. By making the field of view unmovable, the wearable computer effectively locks the virtual window to whatever portion of the media item was displayed at or near the time of the switch to virtual selection mode 113.

In a further aspect of exemplary virtual selection mode 113, once the virtual window is locked, the wearable computer may display a selection icon in the virtual window, as shown by block 116. The wearable computer may then determine, based on head-movement data, the movement of the selection icon within the virtual window, as shown by block 118. The wearable computer may then cause the selection icon to move as determined within the virtual window, as shown by block 120.

In a further aspect, an exemplary wearable computer may allow a user to switch back and forth between modes. For example, a wearable computer may allow a user to switch back and forth between the virtual navigation mode 103, the virtual selection mode 113, and possibly other modes as well.

Further, in order to switch back and forth between virtual navigation mode 103 and virtual selection mode 113, an exemplary embodiment method may involve functionally re-mapping incoming head-movement data. For instance, FIG. 1 shows the wearable computer initially operating in virtual operation mode 103. In this mode, when head-movement data is received at block 102, it is used to determine movement of the field of view within the media item, as shown by block 108. However, when mode-switching signal is received at block 112, the wearable computer switches to virtual selection mode 113 and re-maps head-movement data such that movement of the selection icon within the virtual window is determined based on the head-movement data received at block 102. Then, if a subsequent mode-switching signal is received while the wearable computer in virtual selection mode 113, the wearable computer may switch back to virtual navigation mode 103 and re-map head-movement data to control movement of the field of view within the media item.

Yet further, while the embodiment illustrated in FIG. 1 involves a single mode-switching signal being used to switch back and forth between virtual navigation mode 103 and virtual selection mode 113, exemplary embodiments are not limited to a single mode-switching signal. For example, an exemplary wearable computer may additionally or alternatively be configured to switch to the virtual navigation mode in response to a certain signal that selects the virtual navigation mode, and to switch to the virtual navigation mode in response to a different signal that selects the virtual navigation mode. Other variations are also possible.

A. Virtual Navigation Mode

Figure 2A:
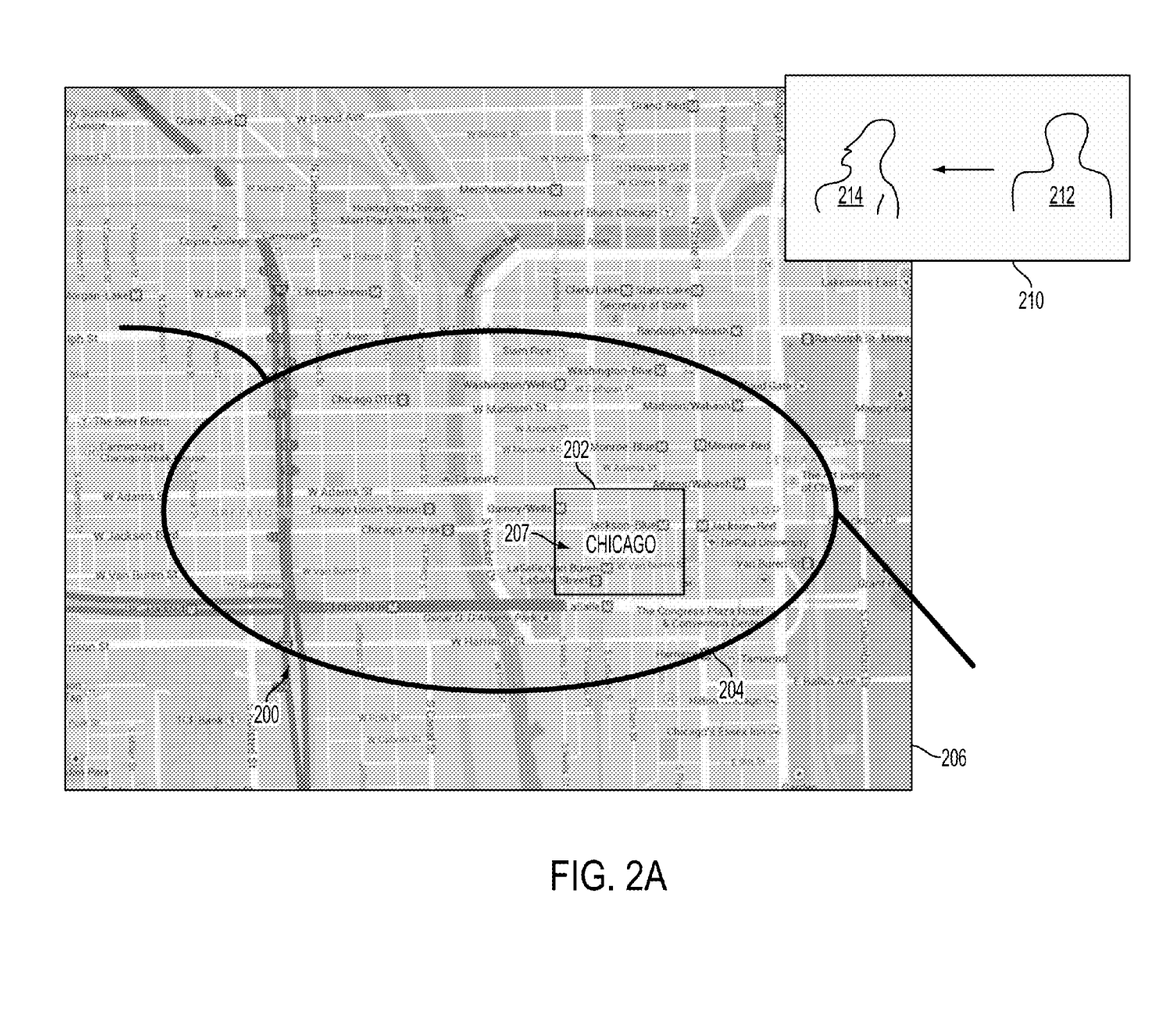
FIG. 2A is a simplified illustration of a head-mounted display operating in a virtual navigation mode.
Figure 2B:
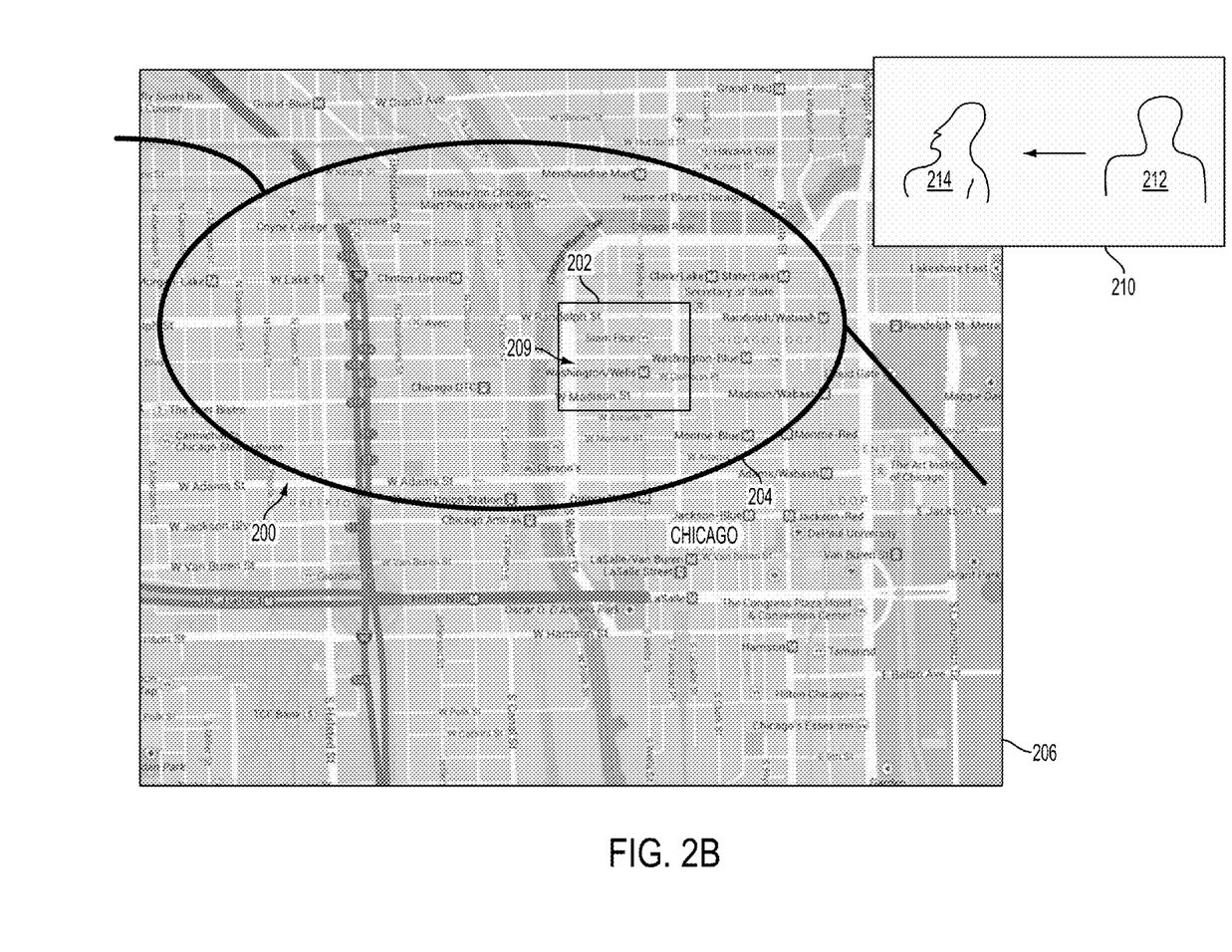
FIG. 2B is another simplified illustration of a head-mounted display operating in a virtual navigation mode.

FIGS. 2A and 2B are simplified illustrations of an HMD operating in a virtual navigation mode 103. As shown in FIGS. 2A and 2B, HMD 200 displays a virtual window 202 that occupies only a portion of the user's view, and thus allows the user to shift the user's focus between the virtual window and a physical-world view. For example, the virtual window 202 may be provided on a graphic display that is embedded in a substantially transparent lens element 204. The virtual window 202 provides a field of view of the portion 207 of the media item 206 that is displayed in the virtual window.

Note that for purposes of illustrating how a portion of media item 206 is displayed in the virtual window 202, a larger part of media item 206 is visible in FIGS. 2A and 2B. In practice, however, a wearer of HMD 200 only sees the portion of media item 206 that is within the field of view of the virtual window 202. As such, media item 206 is not typically viewable outside of virtual window 202. Instead, the area of lens element 204 outside of virtual window 202 may provide a view of the user's physical surroundings or a video recreating the user's physical surroundings, for example. Therefore, in FIG. 2A, the only portion of media item 206 that is typically visible to the user is portion 207. Likewise, in FIG. 2B, the only portion of media item 206 that is typically visible to the user is portion 209.

In virtual navigation mode, the field of view provided by virtual window 202 is moveable based on a user's head movements. For example, box 210 shows a user looking forward at a first position 212, and then moving their head upwards and to the left to a second position 214. Responsive to the head movement shown in box 210, the field of view provided in virtual window 202 may pan to the northwest on map 206.

For example, when the user is in first position 212 and facing forward, the field of view may correspond to the displayed portion 207 shown in FIG. 2A. As the user moves their head upwards and to the left, towards second position 214, the field of view may pan northwest on map 206 in a substantially continual manner, until the field of view in virtual window 202 corresponds with displayed portion 209 of map 206, as shown in FIG. 2B.

In a further aspect of the virtual navigation mode, the physical-world view may be locked. In embodiments where the physical-world view is provided via a transparent lens element, this may not be possible, as the physical-world view is what the user actually sees. However, in embodiments where the physical-world view is graphically recreated, such as with a point-of-view video feed, the physical-world view may be frozen. For example, the physical-world view may be locked to the last video frame that was displayed before entering the virtual navigation mode, or locked to another video frame or image. Locking the physical-world view while linking a user's head movements to movement of the field of view in the virtual window may enhance the sensation that the user is looking around in the virtual world of the media item, via the virtual window. It should be understood, however, that locking the physical-world view is not necessary to provide this experience, as the user may simply focus their attention on the virtual window and mentally exclude the physical-world view.

In a further aspect of virtual navigation mode, functionality of an exemplary wearable computer may include the capability of switching between a dual view, in which the virtual window and the physical-world view are provided simultaneously, and a full-screen view, in which the virtual window is enlarged to substantially fill the user's field of view. In such a full-screen view, the physical-world view may no longer be provided.

B. Virtual Selection Mode

In an exemplary method, a wearable computer may switch back and forth between the virtual navigation mode and a virtual selection mode that may allow a user to interact in a more precise manner with the portion of the media item displayed in the virtual window. For example, illustrated by blocks 116 to 120 in FIG. 1, once the virtual window is locked to a given portion of the media item, the wearable computer may display a selection icon in the virtual window, and map head-movement data to movement of the selection icon in the virtual window.

Figure 3A:
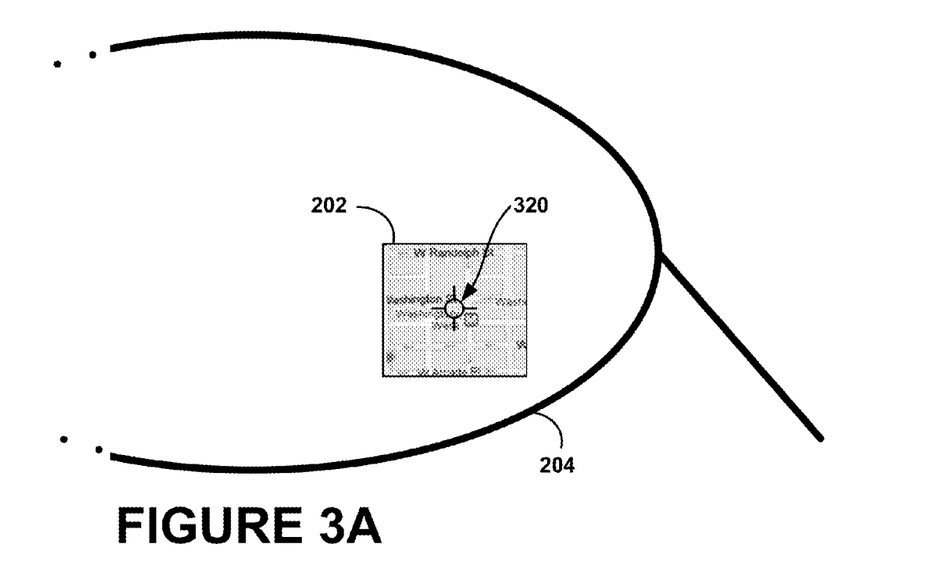
FIG. 3A is a simplified illustration of a head-mounted display operating in a virtual selection mode.
Figure 3B:
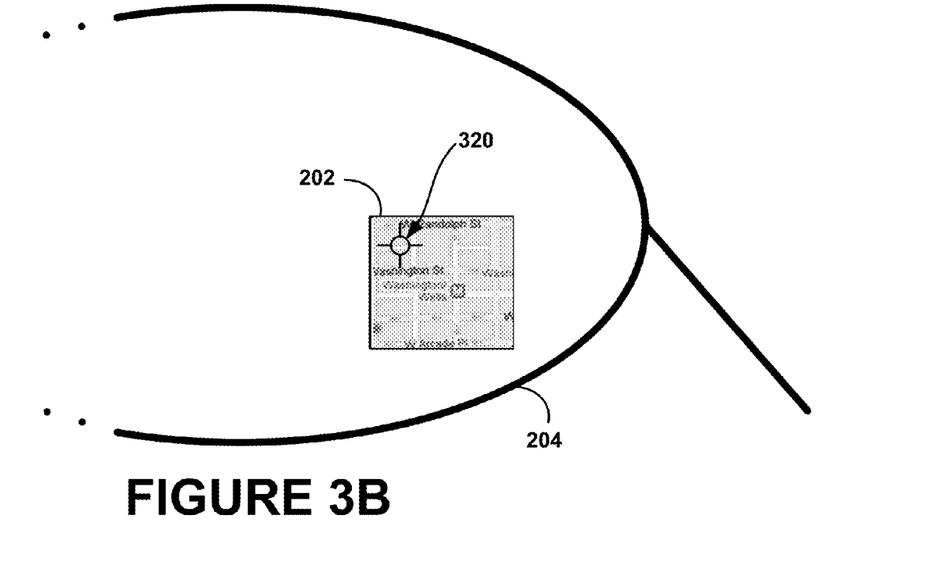
FIG. 3B is another simplified illustration of a head-mounted display operating in a virtual selection mode.

FIGS. 3A and 3B are simplified illustrations of an HMD 204 operating in a virtual selection mode 113. More specifically, in FIGS. 3A and 3B, a reticle 320 is displayed in the virtual window, and overlaid on the displayed portion of the media item. It should be understood, however, that the selection icon is not limited to a reticle and may vary in form without departing from the scope of the invention.

In an exemplary embodiment, when the wearable computer switches to virtual selection mode, the selection icon may initially be displayed in a default position within the virtual window. For example, as shown in FIG. 3A, reticle 320 may initially be centered in the virtual window 202. The initial position of the selection icon may vary, however, as a matter of engineering design choice. It is also possible that the initial position may be a user-adjustable setting of the wearable computer.

The wearable computer may then monitor incoming data from sensors or other sources that provide head-movement data, and move the selection icon according to any received head-movement data. For example, the wearable computer may again receive head-movement data that corresponds to a user moving his or her head upwards and to the left, from a forward-looking first position 212 to a second position 214, as shown in box 210. When the wearable computer receives this head-movement data, and is operating in virtual selection mode, the wearable computer does not change the field of view, as the field of view is generally locked in the virtual selection mode. Instead, the wearable computer moves reticle 320 upwards and to the left (e.g., in a northwest direction on map 206), for example, from the location of reticle 320 shown in FIG. 3A and to the location of reticle 320 shown in FIG. 3B.

In the virtual selection mode, various types of actions or functions may be performed in association with a location in the media item that is selected with the selection icon. For example, the wearable computer may identify a selected building or landmark in map 206, display information related to the selected building or landmark, and/or and perform an Internet search on the building or landmark. As another example, the wearable computer may display directions to or from a selected location on map 206, or provide a form that allows the user to request directions to or from the selected locations. Other types of actions involving the portion of map 206 displayed in virtual window 202 may also be performed while in the virtual selection mode.

In a further aspect, while the virtual window is generally locked (and the field of view generally unmovable) in the virtual selection mode, exceptions may exist where the field of view is movable. For example, if the selection icon is moved to the edge of the virtual window, and possibly held at the edge for a predetermined period of time, a wearable computer may responsively shift the field of view. For instance, if the selection icon is held at the top edge of a displayed portion of a map, the wearable computer may responsively shift the field of view to the north on the map. Other examples are also possible.

In alternative embodiments, a selection icon may additionally or alternatively be controllable via another type of user interface. For example, movement of the selection icon and/or selection of a particular location may be associated with input data from a keyboard or mouse, or possibly even voice commands received via a microphone.

C. Exemplary Applications of Method to Various Types of Media Items

In FIGS. 2A and 2B, the media item 206 is a map (e.g., an image of a map), and as such, may also be referred to as map 206. Various different types of maps may be displayed in a virtual window of an exemplary embodiment. As shown, a graphically-created map may be displayed. Alternatively, a map created with satellite images may be displayed. Further, while a two-dimensional (2D) map is shown in FIGS. 2A and 2B, the virtual window may also provide a field of view within a three-dimensional (3D) map.

Furthermore, various types of media items, other than maps, may be displayed in the virtual window. Generally, the virtual window may display any type of media item, including any type of image, video, or document. In some embodiments, the displayed media item may even take the form of an application window. Other types of media items may also be displayed, without departing from the scope of the invention.

In a further aspect, functionality of the virtual window may vary depending upon the type of media item that is displayed. For example, if an image or video capture is displayed, the virtual navigation mode may allow for identification of a particular area of interest in the image (e.g., the displayed portion), and the virtual selection mode may then allow for selection of a particular object within the area of interest. Actions may then be taken on the selected object. For example, the wearable computer may initiate an image-based search on the object. Additionally or alternatively, text within the image may be selected. The wearable computer may then recognize and perform a text-based search on this text.

As another example, the selection icon may be used to apply photo-editing functions to the displayed area of interest in an image. In particular, the selection icon may take the form of a brush that provides any of a number of well-known photo-editing functions.

As yet another example, a face detection feature may be applied at a selected location in an image. To provide a specific example, consider an image of a crowd at a sporting event that includes tens, hundreds, or even thousands of spectators. The virtual navigation mode may allow a wearer to pan around the image and locate a portion that includes a certain spectator that is of interest. Once this spectator is within the field of view provided by the virtual window, the virtual selection mode may allow a wearer to select the spectator of interest and apply a face-recognition function in an effort to determine who the spectator of interest is. Further, the wearer's contact list and/or publicly available information may be searched for the spectator's contact information and/or the spectator's profile on a social networking site may be displayed.

D. HMD Configurations for an Exemplary Method

In some embodiments, an exemplary method 100 may be implemented with an HMD that includes an opaque graphic display embedded in a larger and substantially transparent lens element. In such embodiments, the opaque display may be arranged in the lens element so as to occupy only a portion of the physical-world view. For instance, a graphic display may be embedded in the right lens element of a pair of glasses, and located towards the lower right side of the lens element. As such, the user can shift their focus downward to look at the display, and look forward to perceive the physical world through the transparent (e.g., substantially see-through) lens element. However, the location of the display within the lens element may vary, without departing from the scope of the invention.

In an embodiment where the graphic display is embedded in a lens element, the lens element may take various forms. For example, it may be made of glass, plastic, or another type of transparent material. Further, the lens element may provide vision correction, and thus function as a standard pair of eyeglasses. However, it is also possible that a non-corrective lens element may be utilized. Additionally or alternatively, the substantially transparent lens element may be polarized, or otherwise configured to provide the functionality of sunglasses. Other variations as to substantially transparent lens elements are also possible, without departing from the scope of the invention.

In general, an exemplary method may be implemented by any HMD that is operable to provide a virtual window that occupies only a portion of the user's field of view, and thus allows for simultaneous viewing of the virtual window and the physical world. In an embodiment where an opaque graphic display is embedded in a larger and substantially transparent lens element, the physical world may be the user's actual view of the world around them; similar to the view when a user is wearing eyeglasses or sunglasses.

However, an exemplary method, such as method 100, may be implemented in other types of HMDs as well. For example, an HMD may also provide a physical-world view via a graphic display that replicates a physical-world view that a user would experience if the HMD were removed. In such an embodiment, the HMD may include an opaque graphic display that substantially fills the user's field of view with, for example, a point-of-view video feed, which substantially replicates what the wearer would see if they were not wearing the HMD. Such a video feed may be said to provide a physical-world window to the user. As such, an exemplary method may also be implemented by an HMD that overlays the virtual window on a portion of such a physical-world window (e.g., overlays the virtual window on a portion of the video).

As another example, a virtual window may also be implemented in an HMD that utilizes a wave guide display. Wave guide displays are operable to display graphical images in a substantially transparent (e.g., see-through) lens element. When graphics are not being displayed by the waveguide display it is generally transparent. Provided with the see-through capability of a waveguide display, a virtual window may be implemented in several ways.

For example, a waveguide display may be embedded in a larger and substantially transparent lens element, in a similar manner as described for an opaque graphic display. In such an embodiment, the virtual window may be displayed so as to occupy the full area of the waveguide display, or may occupy only a portion.

As another example, the virtual window may be displayed in a waveguide display that substantially fills the user's field of view. In such an embodiment, a physical-world view may be provided by making a portion of the waveguide display substantially transparent and/or by displaying a point-of-view video feed, for example, which substantially replicates what the user would see if they were not wearing the HMD. The virtual window may then be displayed, overlaid on or otherwise displayed simultaneously with the physical-world view, so that the wearer can shift their focus between the virtual window and the physical-world view.

E. Other Modes of Operation

In a further aspect, an HMD may be configured for additional modes of operation. For example, modes in which the virtual window provides a physical world view, provides a blank screen, or is removed entirely from the HMD are also possible. Further, the display in which the virtual window is provided may also be used to display other information or to provide other applications.

In some embodiments, a wearable computer may provide a non-virtual mode for the virtual window. In a non-virtual mode, the field of view in the virtual window may be locked to whatever portion of the media was being displayed when the wearable computer switched to non-virtual mode. This may be accomplished in a similar manner as when the wearable computer switches to the virtual selection mode, except that in a non-virtual mode, there is no mechanism such as a selection icon for interacting with the media item. This mode may be useful, for example, when a wearer wishes to use a media item as a reference when their main focus is their physical surroundings. For instance, a wearer may lock the virtual window to a given location on a map, so that they can reference it as they are physically located at and viewing that location.

An embodiment that allows for switching between a virtual mode (e.g., a virtual-navigation mode and/or a virtual-selection mode) and a non-virtual mode may be said to allow a user to switch "physical context" between the virtual window and a physical-world view. A wearer's physical context is generally associated with the view that provides visual feedback corresponding to physical movements. For example, when the virtual window follows a user's head movements, then physical context is provided in the virtual window. On the other hand, when the virtual window is locked, physical context may exist in a wearer's view of the physical-world.

In some embodiments, the HMD may switch to a mode of operation where the virtual window is partially or completely removed from the display. For example, in an embodiment where the HMD includes a graphic display substantially filling the wearer's field of view, the virtual window may be removed from the display.

III. Exemplary Systems and Devices

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 4:
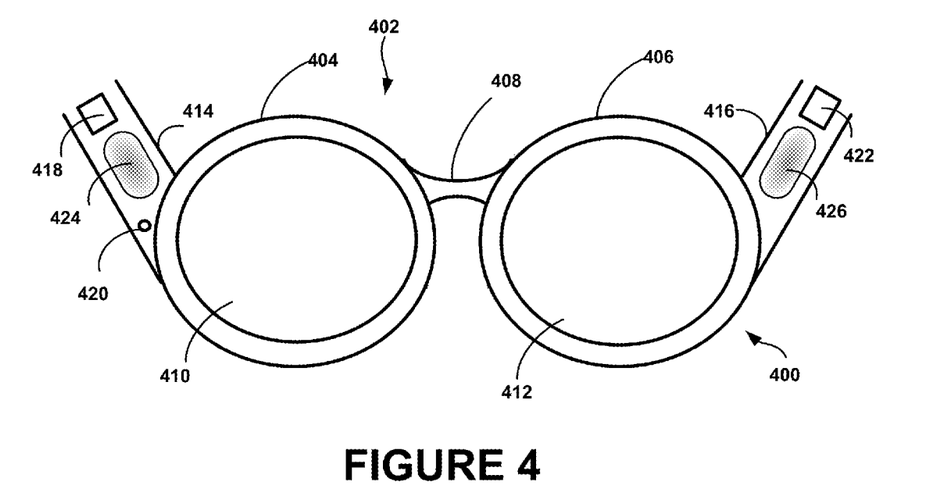
FIG. 4 illustrates an exemplary system for receiving, transmitting, and displaying data.

FIG. 4 illustrates an exemplary system for receiving, transmitting, and displaying data. The system 400 is shown in the form of a wearable computing device. While FIG. 4 illustrates eyeglasses 402 as an example of a wearable computing device, other types of wearable computing devices could additionally or alternatively be used. As illustrated in FIG. 4, the eyeglasses 402 comprise frame elements including lens-frames 404 and 406 and a center frame support 408, lens elements 410 and 412, and extending side-arms 414 and 416. The center frame support 408 and the extending side-arms 414 and 416 are configured to secure the eyeglasses 402 to a user's face via a user's nose and ears, respectively. Each of the frame elements 404, 406, and 408 and the extending side-arms 414 and 416 may be formed of a solid structure of plastic or metal, or may be formed of a hollow structure of similar material so as to allow wiring and component interconnects to be internally routed through the eyeglasses 402. Each of the lens elements 410 and 412 may be formed of any material that can suitably display a projected image or graphic. Each of the lens elements 410 and 412 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 414 and 416 are each projections that extend away from the frame elements 404 and 406, respectively, and are positioned behind a user's ears to secure the eyeglasses 402 to the user. The extending side-arms 414 and 416 may further secure the eyeglasses 402 to the user by extending around a rear portion of the user's head. Additionally or alternatively, for example, the system 400 may connect to or be affixed within a head-mounted helmet structure. Other possibilities exist as well.

The system 400 may also include an on-board computing system 418, a video camera 420, a sensor 422, and finger-operable touchpads 424, 426. The on-board computing system 418 is shown to be positioned on the extending side-arm 414 of the eyeglasses 402; however, the on-board computing system 418 may be provided on other parts of the eyeglasses 402. The on-board computing system 418 may include a processor and memory, for example. The on-board computing system 418 may be configured to receive and analyze data from the video camera 420 and the finger-operable touchpads 424, 426 (and possibly from other sensory devices, user interfaces, or both) and generate images for output from the lens elements 410 and 412.

The video camera 420 is shown to be positioned on the extending side-arm 414 of the eyeglasses 402; however, the video camera 420 may be provided on other parts of the eyeglasses 402. The video camera 420 may be configured to capture images at various resolutions or at different frame rates. Many video cameras with a small form-factor, such as those used in cell phones or webcams, for example, may be incorporated into an example of the system 400. Although FIG. 4 illustrates one video camera 420, more video cameras may be used, and each may be configured to capture the same view, or to capture different views. For example, the video camera 420 may be forward facing to capture at least a portion of the real-world view perceived by the user. This forward facing image captured by the video camera 420 may then be used to generate an augmented reality where computer generated images appear to interact with the real-world view perceived by the user.

The sensor 422 is shown mounted on the extending side-arm 416 of the eyeglasses 402; however, the sensor 422 may be provided on other parts of the eyeglasses 402. The sensor 422 may include one or more of a gyroscope or an accelerometer, for example. Other sensing devices may be included within the sensor 422 or other sensing functions may be performed by the sensor 422.

In an exemplary embodiment, sensors such as sensor 422 may be configured to detect head movement by a wearer of eyeglasses 402. For instance, a gyroscope and/or accelerometer may be arranged to detect head movements, and may be configured to output head-movement data. This head-movement data may then be used to carry out functions of an exemplary method, such as method 100, for instance.

The finger-operable touchpads 424, 426 are shown mounted on the extending side-arms 414, 416 of the eyeglasses 402. Each of finger-operable touchpads 424, 426 may be used by a user to input commands. The finger-operable touchpads 424, 426 may sense at least one of a position and a movement of a finger via capacitive sensing, resistance sensing, or a surface acoustic wave process, among other possibilities. The finger-operable touchpads 424, 426 may be capable of sensing finger movement in a direction parallel or planar to the pad surface, in a direction normal to the pad surface, or both, and may also be capable of sensing a level of pressure applied. The finger-operable touchpads 424, 426 may be formed of one or more transparent or transparent insulating layers and one or more transparent or transparent conducting layers. Edges of the finger-operable touchpads 424, 426 may be formed to have a raised, indented, or roughened surface, so as to provide tactile feedback to a user when the user's finger reaches the edge of the finger-operable touchpads 424, 426. Each of the finger-operable touchpads 424, 426 may be operated independently, and may provide a different function.

Figure 5:
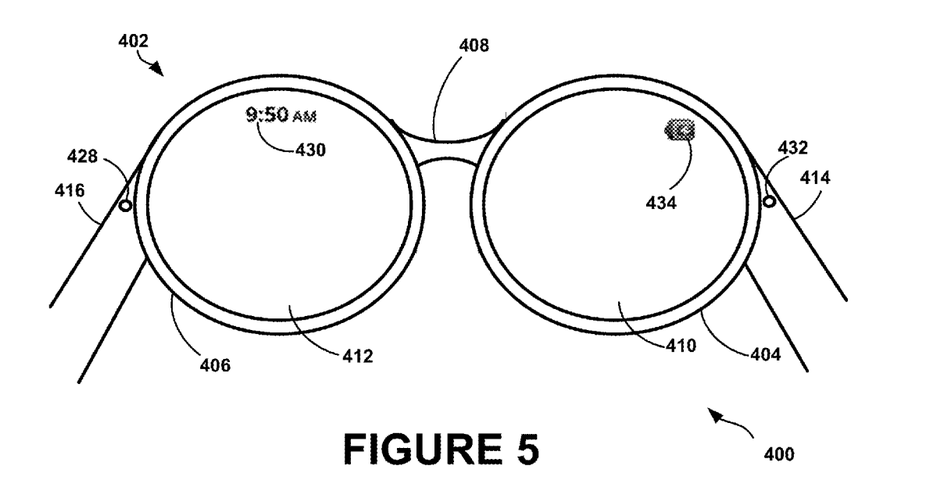
FIG. 5 illustrates an alternate view of the system of FIG. 4.

FIG. 5 illustrates an alternate view of the system of FIG. 4. As shown in FIG. 5, the lens elements 410 and 412 may act as display elements. The eyeglasses 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410.

The lens elements 410 and 412 may act as a combiner in a light projection system and may include a coating that reflects the light projected onto them from the projectors 428 and 432. In some embodiments, a special coating may not be used (e.g., when the projectors 428 and 432 are scanning laser devices).

In alternative embodiments, other types of display elements may also be used. For example, the lens elements 410, 412 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 404 and 406 for driving such a matrix display. Alternatively or additionally, a laser or LED source and scanning system could be used to draw a raster display directly onto the retina of one or more of the user's eyes. Other possibilities exist as well.

While FIGS. 4 and 5 show two touchpads and two display elements, it should be understood that many exemplary methods and systems may be implemented in wearable computing devices with only one touchpad and/or with only one lens element having a display element. It is also possible that exemplary methods and systems may be implemented in wearable computing devices with more than two touchpads.

Figure 6:
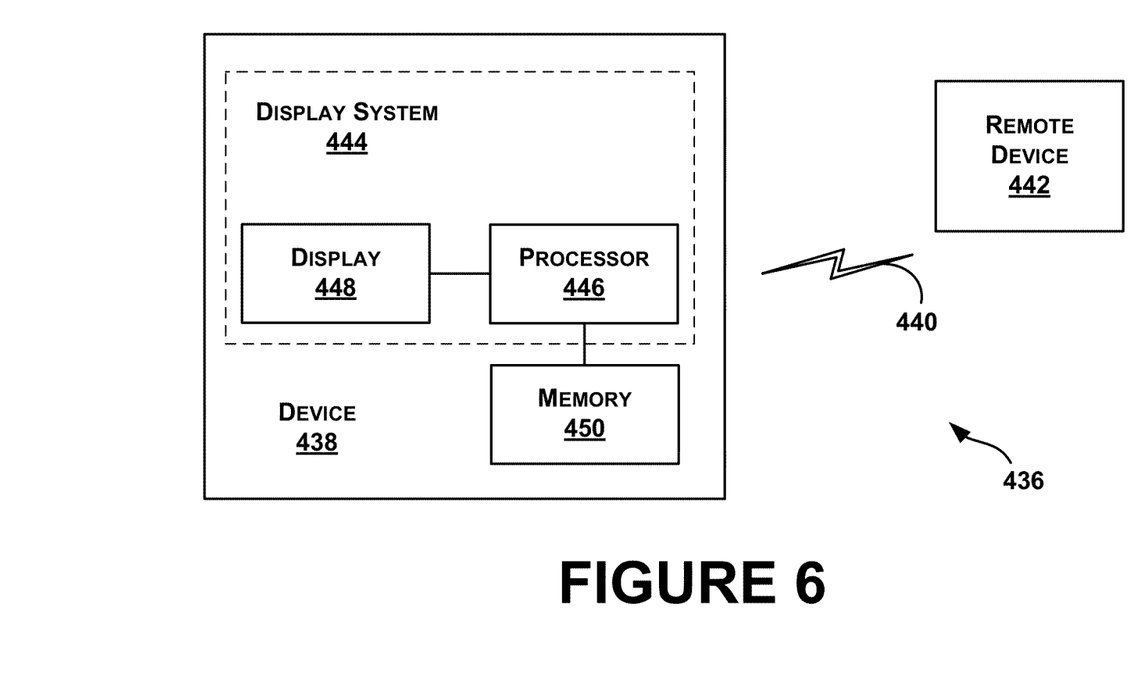
FIG. 6 illustrates an exemplary schematic drawing of a computer network infrastructure in which an exemplary embodiment may be implemented.

FIG. 6 illustrates an exemplary schematic drawing of a computer network infrastructure in which an exemplary embodiment may be implemented. In one system 436, a device 438 communicates using a communication link 440 (e.g., a wired or wireless connection) to a remote device 442. The device 438 may be any type of device that can receive data and display information corresponding to or associated with the data. For example, the device 438 may be a heads-up display system, such as the eyeglasses 402 described with reference to FIGS. 4 and 5.

Thus, the device 438 may include a display system 444 comprising a processor 446 and a display 448. The display 448 may be, for example, an optical see-through display, an optical see-around display, or a video see-through display. The processor 446 may receive data from the remote device 442, and configure the data for display on the display 448. The processor 446 may be any type of processor, such as a microprocessor or a digital signal processor, for example.

The device 438 may further include on-board data storage, such as memory 450 coupled to the processor 446. The memory 450 may store software that can be accessed and executed by the processor 446, for example.

The remote device 442 may be any type of computing device or transmitter including a laptop computer, a mobile telephone, etc., that is configured to transmit data to the device 438. The remote device 442 and the device 438 may contain hardware to enable the communication link 440, such as processors, transmitters, receivers, antennas, etc.

In FIG. 6, the communication link 440 is illustrated as a wireless connection; however, wired connections may also be used. For example, the communication link 440 may be a wired link via a serial bus such as a universal serial bus or a parallel bus. A wired connection may be a proprietary connection as well. The communication link 440 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 442 may be accessible via the Internet and may comprise a computing cluster associated with a particular web service (e.g., social-networking, photo sharing, address book, etc.).

IV. Exemplary User-Interfaces for a Virtual Window

A. Exemplary Touchpad Functionality

As generally described above, an exemplary system may take the form of a device with a touchpad, and in particular, may take the form of a wearable computer, which includes an HMD with a side-mounted touchpad. In such embodiments, the wearable computer may provide for at least partial control of and/or interaction with a virtual window via the side-mounted touchpad.

For example, a wearable computer may display and/or cease displaying the virtual window in response to a certain gesture or gestures on the touchpad. Further, the wearable computer may switch between two or more modes (e.g., back and forth between virtual navigation mode and virtual selection mode) in response to a certain gesture or gestures on the touchpad. Yet further, the wearable computer may initiate one or more types of actions at the location of a selection icon in response to one or more corresponding gestures on the touchpad. Such touchpad gestures may include, for example, various movement-pattern gestures, swiping gestures, tapping gestures, multi-touch gestures, and/or various combinations of these gestures.

In a further aspect of exemplary method, the size of the window and/or the field of view may be adjusted in response to certain adjustment instructions. For example, one adjustment instruction may be mapped to a resize action. A resize action may involve a size adjustment to the virtual window and a proportional size adjustment to the media item. By adjusting the sizes of the virtual window and the media item proportionally, the virtual window is increased in size, but the field of view remains substantially the same (i.e., the portion of the media item that is displayed remains substantially the same).

For example, if an image in the virtual window is 1028 pixels by 768 pixels, and the virtual window provides field of view to a 50 pixel by 50 pixel portion of the image, a resize command may scale the resolution of the image up or down proportionally as the size of the virtual window is increased or decreased. As such, while the displayed portion may occupy more or less area on the graphic display (as the size of the virtual window increases or decreases, respectively), the portion that is displayed remains the same.

In a further aspect, another adjustment instruction may be mapped to a virtual-window zoom action. A virtual-window zoom action involves an adjustment to the size of the virtual window such that the field of view is adjusted (e.g., such that the field of view increases or decreases). To effectuate this action, the wearable computer may keep the size of the media item the same and increase or decrease the viewable size of the virtual window, in order that more or less of the media item is viewable, respectively. For instance, the size of the field of view provided in the virtual window may be increased so that the size of the displayed portion increases from a 50 pixel by 50 pixel portion of the image to a 75 pixel by 75 pixel portion of the image.

In yet a further aspect, another adjustment instruction may be mapped to a media-item zoom action. A media-item zoom action involves an adjustment to the size of the media item so as to adjust the field of view provided in the virtual window. To effectuate this action, the wearable computer may increase or decrease the size of the media item, while keeping the size of the virtual window the same, so that less or more of the media item, respectively, is viewable in the virtual window. For example, if an image is displayed in the virtual window, the wearable computer may scale up or scale down the image, so as to zoom in or zoom out on the portion displayed in the virtual window.

Figure 7A:
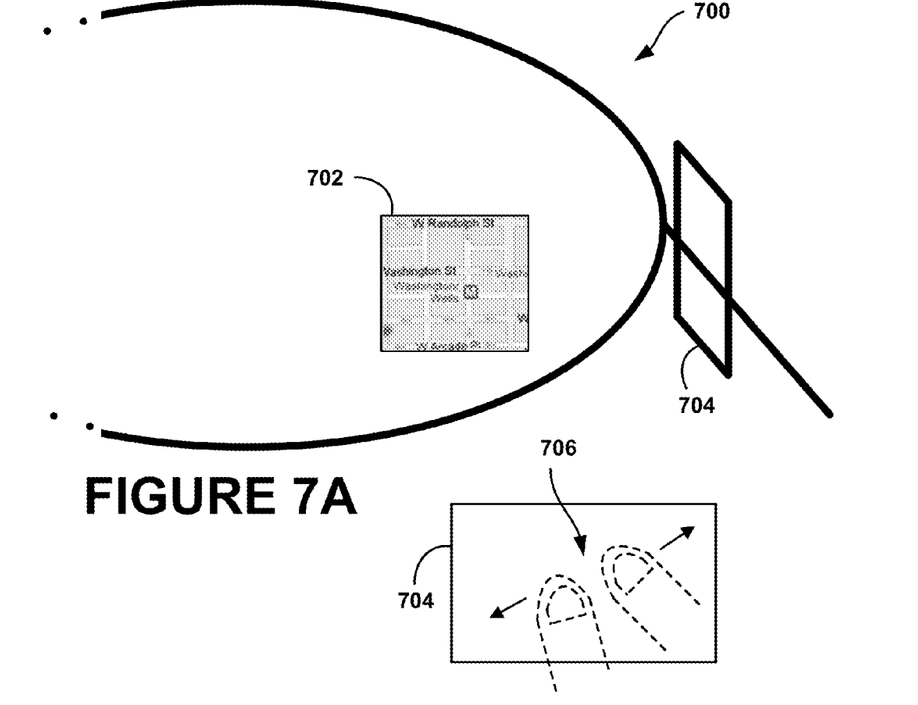
FIG. 7A is a simplified illustration of a head-mounted display having a side-mounted touchpad interface, according to an exemplary embodiment.
Figure 7B:
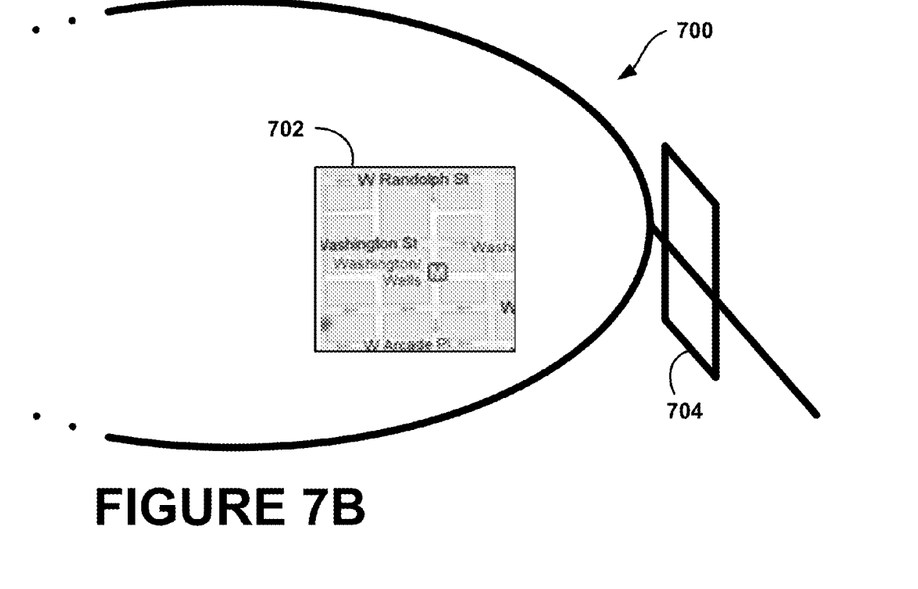
FIG. 7B is another simplified illustration of a head-mounted display having a side-mounted touchpad interface, according to an exemplary embodiment.

In an embodiment where the virtual window is implemented by a wearable computer having a touchpad interface, the various adjustment instructions may be triggered by certain gestures on the touchscreen interface. For example, FIGS. 7A and 7B are simplified illustrations of a head-mounted display having a side-mounted touchpad interface, according to an exemplary embodiment. In particular FIGS. 7A and 7B illustrate an HMD 700, which displays a virtual window 702 and includes a side-mounted touchpad 704.

In an exemplary embodiment, multi-touch gestures such as "pinch" or "reverse-pinch" gestures may be mapped to adjustment instructions. For instance, a multi-touch gesture 706 may be detected on touchpad 704. The wearable computer may interpret multi-touch gesture 706 as, for example, a resize action. In this case, multi-touch gesture 706 is a "reverse-pinch" gesture, which may be mapped to a resize action that increases the size of the virtual window. To illustrate, virtual window 702 is of a first size in FIG. 7A. However, when multi-touch gesture 706 triggers a resize action, the wearable computer increases the size of the virtual window 702 and the media item proportionally. As a result, the size of virtual window 702 increases, but the field of view provided by the virtual window remains the same, as shown in FIG. 7B.

In a further aspect, the same or different multi-touch gestures may be used for virtual-window zoom actions and/or media-item zoom actions. Further, when the same multi-touch gestures are provided for all resize and zoom actions, an initial selection gesture may be provided that allows the user to indicate which type of action should be performed.

B. Other User-Interface Functionality

In addition to or as an alternative to a touchpad, an exemplary system may allow for the virtual window to be operated and/or interacted with via other types of user interfaces. In general, almost any type of user interface may be used. For example, voice commands may be detected in data received from a microphone, or a keyboard may allow for keystroke commands. Other types of user interfaces are also possible.

In some embodiments, a point-of-view video feed may be analyzed and commands inferred when certain characteristics are detected in the video feed. For example, a stop-and-stare gesture may be detected in a point-of-view video. More specifically, when a predetermined number of video frames are substantially similar, the wearable computer may take this as an indication that the wearer is fixating on a scene (or possibly on a certain object in the scene), and interpret this as a stop-and-stare gesture. In response to detecting such a stop-and-stare gesture, the wearable computer may, for example, open the virtual window that provides a field of view within a frame capture from the point-of-view video. Further, when the wearable computer opens the virtual window, the virtual window may display a portion of the frame capture that the user is determined to be fixating on.

In a further aspect, an action may be taken in response to head-movement data that is indicative of the user staring at something. For example, if the wearable computer is in virtual navigation mode, and the user has been moving the field of view in the virtual window (e.g., by moving their head), but then stops moving their head for a predetermined period of time, the wearable computer may interpret this as an indication the user is looking at a portion of the media item that they are interested in. Accordingly, when the wearable computer detects substantial head movement, followed by a predetermined period without substantial head movement, it may respond by switching from virtual navigation mode to virtual selection mode.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A head-mountable device comprising:
a see-through display;
a non-transitory computer-readable medium; and
program instructions stored on the non-transitory computer-readable medium and executable by at least one processor to:
 receive head-movement data that is indicative of head movement;
 cause the head-mountable device (HMD) to operate in a first mode in which the HMD is configured to:
  (a) simultaneously provide a virtual window in the see-through display of the HMD and a physical-world view;
  (b) display, in the virtual window, a portion of a media item that corresponds to a field of view, wherein the field of view is moveable in a substantially continual manner throughout the media item;
  (c) determine, based on the head-movement data, movement of the field of view; and
  (d) update the portion of the media item that is displayed in the virtual window according to the determined movement of the field of view; and
 receive mode-switching input data and responsively cause the HMD to switch from operation in the first mode to operate in a second mode in which the HMD is configured to:
  (e) display a selection icon and a specific portion of the media item in the virtual window, wherein the specific portion of the media item that is displayed corresponds to the field of view at or near receipt of the mode-switching input data, and wherein the virtual window is locked to the specific portion of the media item in response to the receipt of the mode-switching input data;
  (f) determine, based on the head-movement data, movement of the selection icon within the virtual window; and
  (g) move the selection icon as determined within the virtual window, while the specific portion of the media item is displayed.

2. The head-mountable device of claim 1, wherein the HMD further comprises a side-mounted touchpad interface.

3. The head-mountable device of claim 1, wherein the first mode is a virtual-navigation mode and the second mode is a virtual-selection mode.

4. The head-mountable device of claim 1, wherein the see-through display is arranged so as to obstruct only a portion of the physical-world view when the head-mountable device is worn.

5. The head-mountable device of claim 1, wherein the virtual window is overlaid on a portion of a physical-world window that is also displayed in the see-through display of the HMD, wherein the physical-world window provides the physical-world view via a graphic representation of a user's field-of-view.

6. The head-mountable device of claim 1, wherein the HMD comprises a waveguide display, and wherein the virtual window is displayed in at least a portion of the waveguide display.

7. The head-mountable device of claim 1, further comprising program instructions stored on the non-transitory computer-readable medium and executable by at least one processor to:
 receive data comprising a selection indication; and
 responsive to the selection indication, initiate a selection action at a current location of the selection icon.

8. The head-mountable device of claim 7, wherein the data comprising the selection indication is associated with a predetermined gesture, wherein the predetermined gesture comprises at least one of: (a) a predetermined gesture on a touchpad interface and (b) a stop-and-stare user gesture detected in a point-of-view video associated with the HMD.

9. The head-mountable device of claim 1, further comprising program instructions stored on the non-transitory computer-readable medium and executable by at least one processor to cause the HMD to cease display of the virtual window in the second mode.

10. The head-mountable device of claim 1, wherein the virtual window is of a first size, wherein the media item is of a second size, and wherein the first size is smaller than the second size.

11. The head-mountable device of claim 1, further comprising program instructions stored on the non-transitory computer-readable medium and executable by at least one processor to:
 receive data comprising a first adjustment instruction;
 in response to the first adjustment instruction, initiate a resize action, wherein the resize action comprises a size adjustment to the virtual window and a size adjustment to the media item such that the field of view remains substantially the same;

receive data comprising a second adjustment instruction;

in response to the second adjustment instruction, initiate a virtual-window zoom action, wherein the virtual-window zoom action comprises an adjustment to size of the virtual window such that the field of view is adjusted;

receive data comprising a third adjustment instruction; and in response to the third adjustment instruction, initiate a media-item zoom action, wherein the media-item zoom action comprises an adjustment to size of the media item such that the field of view is adjusted.

12. The head-mountable device of claim 1, further comprising program instructions stored on the non-transitory computer-readable medium and executable by at least one processor to:

detect head-movement data indicative of substantial head movement followed by a predetermined period without substantial head movement; and responsively cause the HMD to switch between the first mode and the second mode.

13. The head-mountable device of claim 1, further comprising program instructions stored on the non-transitory computer-readable medium and executable by at least one processor to, while in the first mode:

receive a data instruction indicating to switch to a full-screen view of the virtual window; and responsively cease providing the virtual window and the physical-world view simultaneously and instead provide the full-screen view of the virtual window.

14. A computer-implemented method comprising:

receiving, at a head-mountable device (HMD), head-movement data that is indicative of head movement;

causing the HMD to operate in a first mode by:
  (a) simultaneously providing a virtual window in a see-through display of the HMD and a physical-world view;
  (b) displaying a portion of a media item in the virtual window, wherein the portion of the media item that is displayed corresponds to a field of view, wherein the field of view is moveable in a substantially continual manner throughout the media item;
  (c) using the head-movement data as a basis for determining movement of the field of view within the media item; and
  (d) updating the portion of the media item that is displayed in the virtual window according to the determined movement of the field of view;

receiving, by the wearable computer, mode-switching input data and responsively causing the HMD to switch from operation in the first mode to operation in a second mode by:
  (e) causing a selection icon and a specific portion of the media item to be displayed in the virtual window, wherein the specific portion of the media item that is displayed corresponds to the field of view at or near receipt of the mode-switching input data, and wherein the virtual window is locked to the specific portion of the media item in response to the receipt of the mode-switching input data;
  (f) determining, based on the head-movement data, movement of the selection icon within the virtual window; and
  (g) moving the selection icon as determined within the virtual window while the specific portion of the media item is displayed.

15. The method of claim 14, further comprising:

causing a selection icon to be displayed in the virtual window;

determining, based on the head-movement data, movement of the selection icon within the virtual window; and causing the selection icon to move as determined within the virtual window.

16. The method of claim 15, further comprising receiving a selection indication and responsively initiating a selection action at a current location of the selection icon.

17. The method of claim 14, further comprising, while in the second mode, causing the HMD to cease display of the virtual window.

18. A non-transitory computer-readable medium having instructions stored thereon, the instructions comprising:

instructions for receiving head-movement data that is indicative of head movement;

instructions for causing a head-mountable device (HMD) to operate in a first mode by:
  (a) simultaneously providing a virtual window in a see-through display of the HMD and a physical-world view;
  (b) displaying a portion of a media item in the virtual window, wherein the portion of the media item that is displayed corresponds to a field of view, wherein the field of view is moveable in a substantially continual manner throughout the media item;
  (c) using the head-movement data as a basis for determining movement of the field of view within the media item; and
  (d) updating the portion of the media item that is displayed in the virtual window according to the determined movement of the field of view;

instructions for receiving mode-switching input data and responsively causing the HMD to switch from operation in the first mode to operation in a second mode by:
  (e) causing a selection icon and a specific portion of the media item to be displayed in the virtual window, wherein the specific portion of the media item that is displayed corresponds to the field of view at or near receipt of the mode-switching input data, and wherein the virtual window is locked to the specific portion of the media item in response to the receipt of the mode-switching input data;
  (f) determining, based on the head-movement data, movement of the selection icon within the virtual window; and
  (g) moving the selection icon as determined within the virtual window while the specific portion of the media item is displayed.

19. The computer-readable medium of claim 18, further comprising instructions for, while in the second mode, causing the HMD to cease display of the virtual window.

* * * * *